(12) United States Patent
Katsurabayashi et al.

(10) Patent No.: US 6,225,983 B1
(45) Date of Patent: May 1, 2001

(54) OPERATION KEY REGISTRATION SYSTEM FOR A COORDINATE INPUT DEVICE

(75) Inventors: Masahiko Katsurabayashi; Susumu Yamamoto; Tadahiko Ikegaya; Nobuyuki Shigeeda, all of Saitama (JP)

(73) Assignee: Fuji Xerox Co., LTD, Tokyo (JP)

( * ) Notice: Subject to any disclaimer, the term of this patent is extended or adjusted under 35 U.S.C. 154(b) by 0 days.

(21) Appl. No.: 08/318,513

(22) Filed: Oct. 5, 1994

Related U.S. Application Data

(63) Continuation of application No. 08/026,634, filed on Mar. 5, 1993, now abandoned, which is a continuation of application No. 07/596,038, filed on Oct. 11, 1990, now abandoned.

(51) Int. Cl.$^7$ ................................................. G09G 5/00
(52) U.S. Cl. .......................................... 345/173; 345/172
(58) Field of Search .................................. 340/706, 709, 340/712, 711; 382/13, 59; 178/18, 19; 358/468; 345/156, 157, 173, 179, 182, 180, 104, 146, 113, 134; 379/354, 355, 100; 341/22, 23

(56) References Cited

U.S. PATENT DOCUMENTS

| | | | |
|---|---|---|---|
| 3,158,317 | * 11/1964 | Alexander | 178/18 |
| 4,431,870 | * 2/1984 | May et al. | 340/712 |
| 4,633,436 | * 12/1986 | Flumy | 178/18 |

(List continued on next page.)

FOREIGN PATENT DOCUMENTS

| | | |
|---|---|---|
| 0030160 | * 6/1981 | (DE) . |
| 3117207 | * 2/1982 | (DE) . |
| 3141450 | * 6/1982 | (DE) . |
| 3741450 | * 6/1982 | (DE) . |
| 3126886 | * 1/1983 | (DE) . |
| 103317 | * 8/1983 | (DE) . |
| 3335657 | * 4/1984 | (DE) . |
| 3714558 | * 11/1987 | (DE) . |
| 3732519 | * 4/1989 | (DE) . |
| 3809683 | * 10/1989 | (DE) . |
| 3912225 | * 10/1989 | (DE) . |
| 3732519 | * 4/1999 | (DE) . |
| 0030160 | * 6/1981 | (EP) . |
| 0103317 | * 8/1983 | (EP) . |
| 0 277 609 | 8/1988 | (EP) . |
| 2 154 349 | 9/1985 | (GB) . |
| 2 219 675 | 12/1989 | (GB) . |
| 0163337 | * 8/1984 | (JP) . |
| 61-40665 | 2/1986 | (JP) . |
| 0137144 | * 6/1986 | (JP) . |
| 0297774 | * 12/1986 | (JP) . |
| 62-23158 | 2/1987 | (JP) . |
| 0023158 | * 2/1987 | (JP) . |
| 63-23470 | 1/1988 | (JP) . |
| 63-151258 | 6/1988 | (JP) . |
| 63-190472 | 8/1988 | (JP) . |

OTHER PUBLICATIONS

Firmenschrift, "Digitalisiertablett DIGIT–01," Digital, MU 2355/30, Feb. 1985.*
D. B. Hidebrand, "Touch–Sensitive Screen Proximate and Electonically Composable Display," IBM Disclosure Bulletin, vol. 27, No. 1A, Jun. 1984.*
R. N. Wolfe, Keyboard for Electronic Table or Digitizer, IBM Technical Disclosure Bulletin, vol. 14, No. 3, Aug. 1971, pp. 807–808.*

* cited by examiner

Primary Examiner—Chanh Nguyen
(74) Attorney, Agent, or Firm—Finnegan, Henderson, Farabow, Garrett & Dunner, L.L.P.

(57) ABSTRACT

In a key registering mode, a freely set key table is produced which correlates operation key information representing a function of a specified key and area information representing an arbitrarily selected area of a coordinate input surface of a coordinate input device. A key name of the registered operation key may further be registered in the freely set key table.

27 Claims, 15 Drawing Sheets

U.S. PATENT DOCUMENTS

| | | | |
|---|---|---|---|
| 4,703,412 | * | 10/1987 | Cunniungham et al. ............ 340/712 |
| 4,755,811 | * | 7/1988 | Slavin et al. ......................... 345/134 |
| 4,763,356 | * | 8/1988 | Day, Jr. et al. ...................... 345/113 |
| 4,881,608 | * | 11/1989 | Otsuki .................................... 178/18 |
| 4,896,223 | * | 1/1990 | Todome ................................ 340/712 |
| 4,916,740 | * | 4/1990 | Noda et al. .......................... 340/712 |
| 4,930,017 | * | 5/1990 | Izawa .................................. 358/468 |
| 4,937,762 | * | 6/1990 | Todome ................................ 345/173 |
| 5,119,079 | * | 6/1992 | Hube et al. .......................... 345/146 |
| 5,208,683 | * | 5/1993 | Okada .................................... 341/22 |

FIG. 5(a)

(FIXED KEY TABLE)

| FIXED KEY INFORMATION | FIRST COORDINATES (X, Y) | SECOND COORDINATES (X, Y) |
|---|---|---|
| START | A1 (X1 Y1) | A1' (X1' Y1') |
| STOP | A2 (X2 Y2) | A2' (X2' Y2') |
| 1 | A3 (X3 Y3) | A3' (X3' Y3') |
| 2 | A4 (X4 Y4) | A4' (X4' Y4') |
| ⋮ | ⋮ | ⋮ |
| 9 | A11 (X11 Y11) | A11' (X11' Y11') |

FIG. 5(b)

(FREELY SET KEY TABLE)

| FREELY SET KEY INFORMATION | FIRST COORDINATES | SECOND COORDINATES |
|---|---|---|
| START | B1 (X21 Y21) | B1' (X21' Y21') |
| STOP | B2 (X22 Y22) | B2' (X22' Y22') |
| 1 | B3 (X23 Y23) | B3' (X23' Y23') |
| 2 | B4 (X24 Y24) | B4' (X24' Y24') |
| ⋮ | ⋮ | ⋮ |
| 9 | X31 Y31 | X31' Y31' |

| FREELY SET KEY INFORMATION | FIRST COORDINATES | SECOND COORDINATES | KEY NAME |
|---|---|---|---|
| START | B1 (X21 Y21) | B1' (X21' Y21') | 開 始 |
| STOP | B2 (X22 Y22) | B2' (X22' Y22') | 停 止 |
| 1 | B3 (X23 Y23) | B3' (X23' Y23') | 1 |
| 2 | B4 (X24 Y24) | B4' (X24' Y24') | 2 |
| ⋮ | ⋮ | ⋮ | ⋮ |

OPERATION KEY REGISTRATION SYSTEM FOR A COORDINATE INPUT DEVICE

This application is a continuation of application Ser. No. 08/026,634, filed Mar. 5, 1993, now abandoned, itself a continuation of application Ser. No. 07/596,038, filed Oct. 11, 1990, now abandoned.

BACKGROUND OF THE INVENTION

The present invention relates to a system of registering operation keys, and more particularly to a system of registering operation keys in arbitrarily selected areas of a coordinate input device.

With the incorporation of multiple functions into copying machines, facsimile machines, and so forth, proposals have hitherto been made for techniques for integrating the data input from a coordinate input device connected to a copying machine, a facsimile machine, or the like with the information read from an original document by such a machine.

Among the prior art cases which have disclosed a copying machine connected with a coordinate input device are Japanese Patent Application Unexamined Publication Nos. Sho. 63-190472 and Sho. 63-23470.

The former discloses a technique for achieving a smaller size digitizer (coordinate input device) by displaying a mode selecting section in the coordinate position detecting area of the digitizer and by permitting the selection of a mode by the operation of a mode change-over switch. Moreover, the latter discloses a technique for specifying the coordinates by pushing desired points on a tablet of a coordinate input device and for specifying a character by pushing a desired block on the tablet after pushing a character key.

Moreover, a prior art case disclosing a facsimile machine connected with a coordinate input device is found, for example, in Japanese Patent Application Unexamined Publication No. Sho. 63-151258. In this Official Publication is disclosed a technique for transmitting graphic information input from a coordinate input device in synthesis with the information read from an original document for transmission.

Furthermore, Japanese Patent Application Unexamined Publication No. Sho. 61-40665 discloses a technique for offering a simple way to register non-built-in, special characters from a coordinate input device connected to a character processing system operated on a computer, such as a personal computer and a Japanese-language word-processor.

The present assignee is now in the course of developing such an apparatus as will satisfy the users' tastes as well as improve the operational efficiency by enabling them freely to set function keys of a copying machine, a facsimile machine, or the like on a coordinate input surface of a coordinate input device connected to such a machine. One of the inventions made in one phase of this project is a "Single Block Registration system of Operating Steps", Japanese Patent Application No. Hei. 1-261767 filed in the name of the present assignee.

In this Single Block Registration System, arbitrarily selected areas on the coordinate input surface of a coordinate input device are allocated to function keys. Thus, a method of allocating such selected areas to the function keys becomes necessary, but the prior art mentioned above does not present any technique that fulfills this requirement.

SUMMARY OF THE INVENTION

The present invention has been made in view of the above-mentioned circumstances, and an object of this invention is to offer an operation key registering system which can enable users to register function keys in an easy way in arbitrarily selected areas on the coordinate input surface of a coordinate input device.

For the purpose of accomplishing the object mentioned above, a first feature of the present invention consists in providing a means for selecting a registering mode and a means for generating a freely set key table, which correlates the operation key information input at the time when the registering mode is selected and the arbitrarily selected area information input from a coordinate input device.

A second feature consists in providing a means for giving key names to the areas for freely set keys allocated on the coordinate input surface of a coordinate input device.

A third feature is found in providing a means for recognizing a plural number of menu mats in the case where a means for inputting operation keys is a menu mat.

According to the present invention, the operation key information and the area information are correlated with each other and registered on the freely set key table when they are input at the time when the registering mode is selected. As the result of this procedure, the system makes it possible to register the function information in arbitrarily selected areas on the coordinate input area.

Also, the system offers much convenience in an executing mode since names are given to the individual set areas. Moreover, the system is capable of registering many types of functions in the selected area in the case of using a plural number of menu mats for the registering operation.

BRIEF DESCRIPTION OF THE DRAWINGS

FIGS. 5(a) and 5(b) are charts illustrating examples of a fixed key table and a freely set key table, respectively;

DETAILED DESCRIPTION OF THE PREFERRED EMBODIMENTS

In the subsequent part, a detailed description is made of the present invention with reference to the accompanying drawings.

First, an outline of the present invention will be described with reference to a functional block diagram given in FIG. 1.

Figure 1:
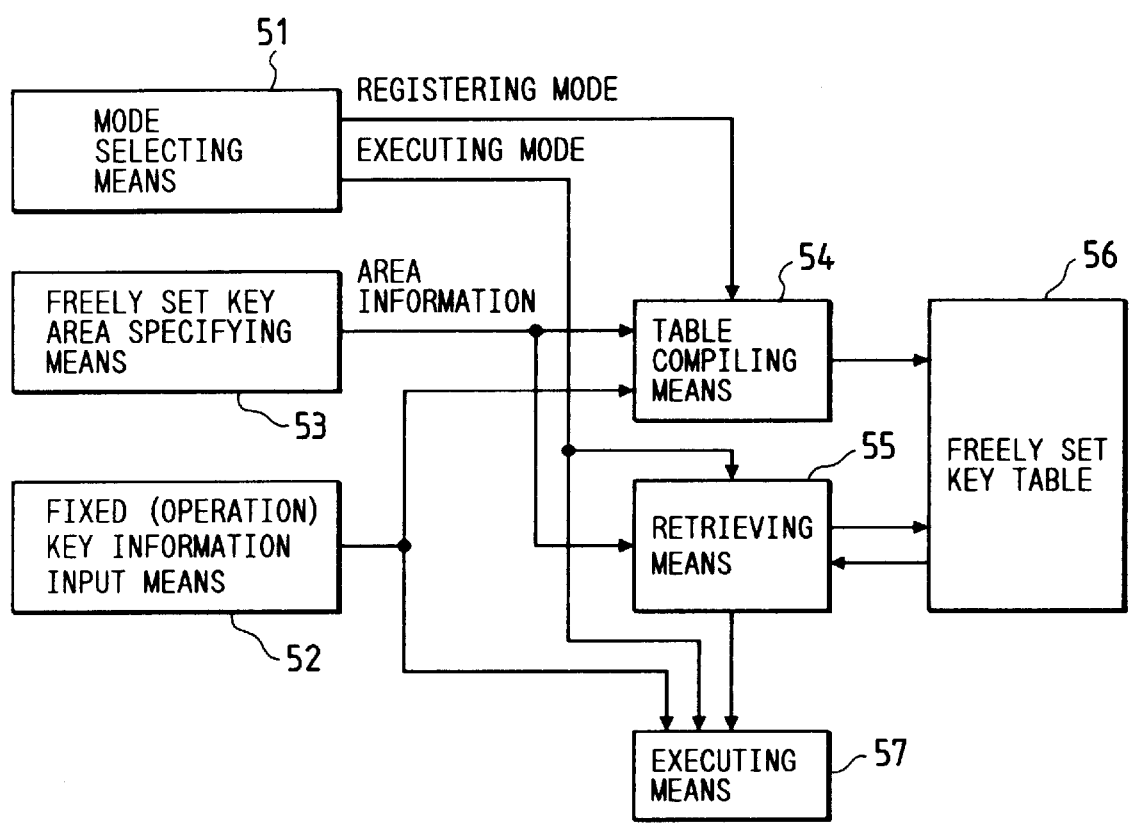
FIG. 1 is a functional block diagram illustrating the outline of the present invention.

In FIG. 1, reference number 51 indicates a mode selecting means which selects an operating mode of the apparatus, such as a registering mode and an executing mode. Reference number 52 denotes a fixed (operation) key information input means which is used for the input of function information and corresponds to various operation keys incorporated in a control panel of the apparatus and, as will become apparent from the following description, to fixed keys formed on a menu mat to be mounted on a coordinate input surface of a coordinate input device. Reference number 53 stands for a freely set key area specifying means for setting up areas on the coordinate input surface by indicating one or two points thereon.

Reference number 54 indicates a table compiling means which is put into an effective state in the registering mode. Number 55 is a retrieving means which is put into an effective state in the executing mode. Reference number 56 indicates a freely set key table which is generated by the table compiling means 54, and contents of which establish the correlation between the function information input from the fixed (operation) key information input means 52 and the area information input from the freely set key area specifying means 53. Also, reference number 57 is a means which executes operations in accordance with the information fed from the fixed (operation) key information input means 52 or from the freely set key area specifying means 53.

With the construction described above, when the registering mode is selected by the mode selecting means 51 and the function information is input from the fixed (operation) key information input means 52, the function information thus input is registered in the prescribed column on the freely set key table 56 by the table compiling means 54. Then, when the information indicating an area is input from the freely set key area specifying means 53, the area information is registered in the prescribed column on the freely set key table 56, being set in correlation with the function information. In this manner, it is possible to allocate a given function to an arbitrarily selected area on the coordinate input surface.

On the other hand, when a function thus assigned to an area is to be read out, the mode selecting means 51 establishes the executing mode, in which the freely set key area specifying means 53 indicates a desired area. Then, the retrieving means 55 performs a retrieving operation on the freely set key table 56 using the indicated particular area as the retrieval information, and reads the corresponding function information from the table 56. The function information thus obtained is transmitted to and executed by the executing means 57.

The above description forms the outline covering the construction and functions of the invention, including the peripheral elements of the invention. It will be evident in light of a further description to be made later that the principal features of the present invention consist in, among those mentioned above, that functions are registered in arbitrarily selected areas on the coordinate input surface by the use of the fixed (operation) key information input means 52, the freely set key area specifying means 53, the table compiling means 54, and the freely set key table 56.

In the following section, the present invention is described in specific terms.

Figure 2:
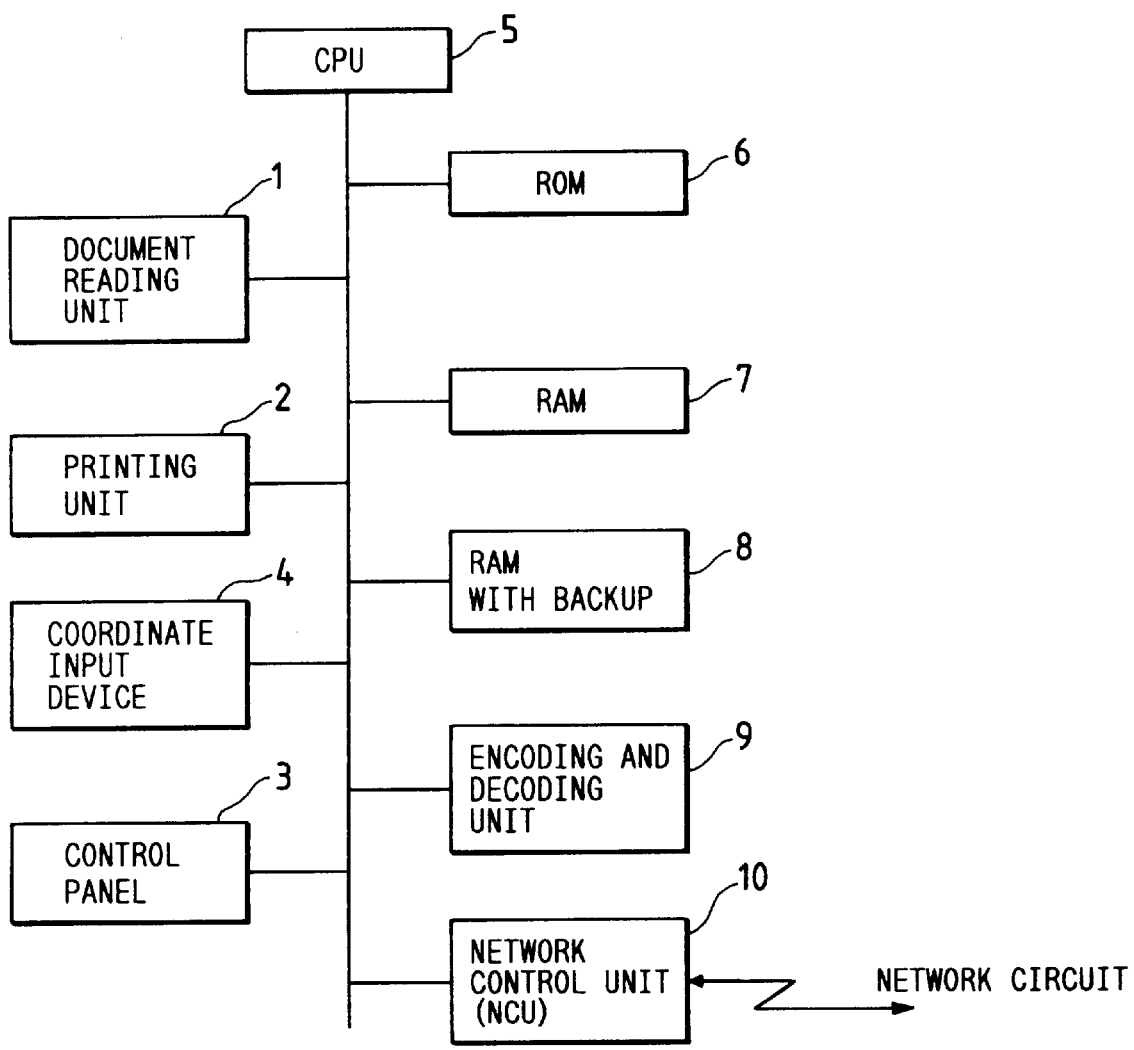
FIG. 2 is a block diagram illustrating the hardware construction of an apparatus to which the present invention is applied.

FIG. 2 is a block diagram illustrating the hardware construction of one example of an apparatus (facsimile machine) to which the present invention is applied. Shown in FIG. 2 are a document reading unit in the facsimile machine; a printer unit 2; a control panel 13; and, a coordinate input device 4; a central processing unit (CPU 5); a read only memory (ROM) 6; a first random access memory (RAM) 7; a second random access memory (RAM) 8 backed-up by a battery or the like; 9, an encoding and decoding unit 9; and 10, a network control unit 10.

Figure 3:
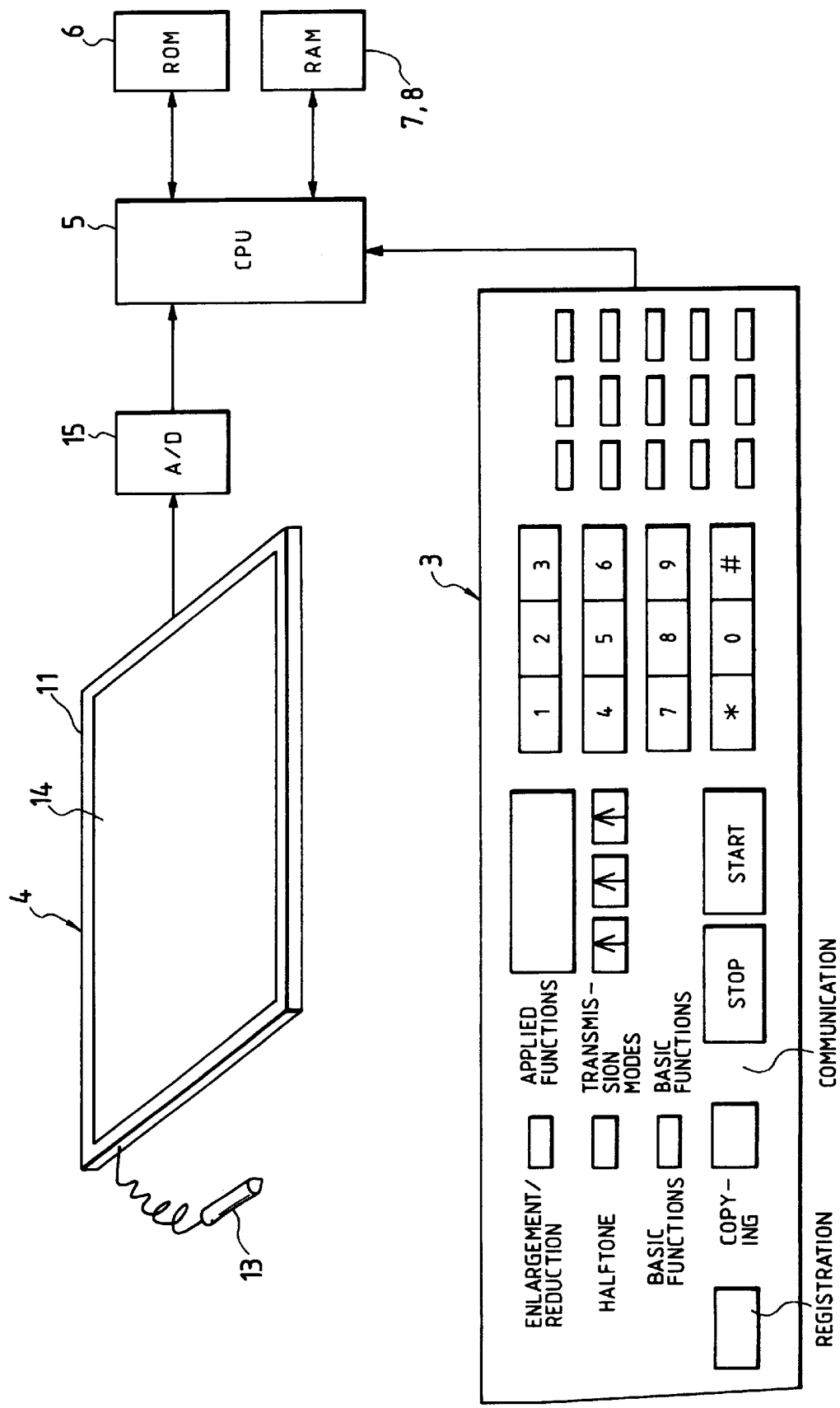
FIG. 3 is a block diagram illustrating the construction of the present invention.

FIG. 3, which is a more specific representation of the construction of a first embodiment of the invention, illustrates the essential parts of FIG. 2. Shown in FIG. 3 are a coordinate input surface 11 of the coordinate input device 4; a stylus pen 13; a menu mat 14 placed on the coordinate input area 11; and an analog-digital (A/D) converter 15. All the other reference numbers or marks in FIG. 3 represent identical or equivalent items as those given in FIG. 2. The types and arrangement of the keys indicated on the control panel 3 merely give illustrative examples and are not limited to these.

The construction and operating principle of the coordinate input device 4 are described in detail in Japanese Patent Application No. Hei. 1-261767 under the title "Single Block Registration system of Operating Steps", and are therefore omitted from description here.

Figure 4B:
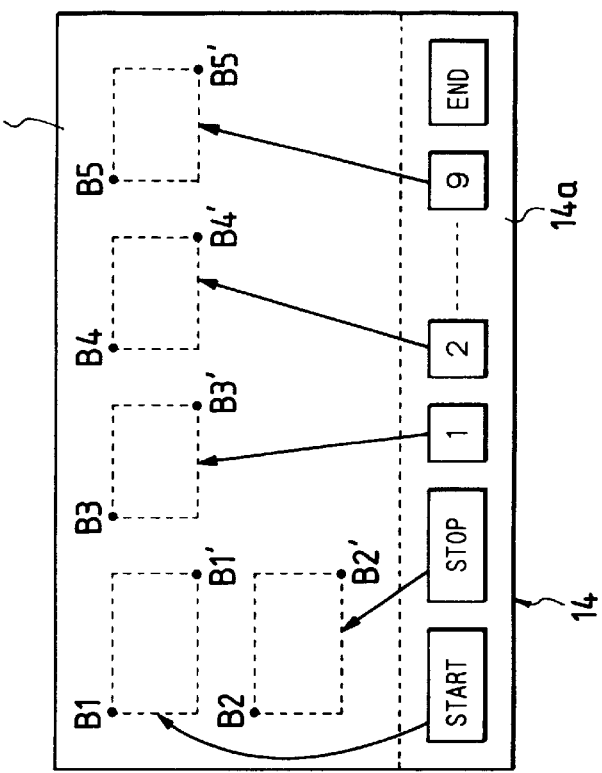
FIGS. 4(a) and 4(b) are drawings for illustration of a first embodiment of the present invention.
Figure 4A:
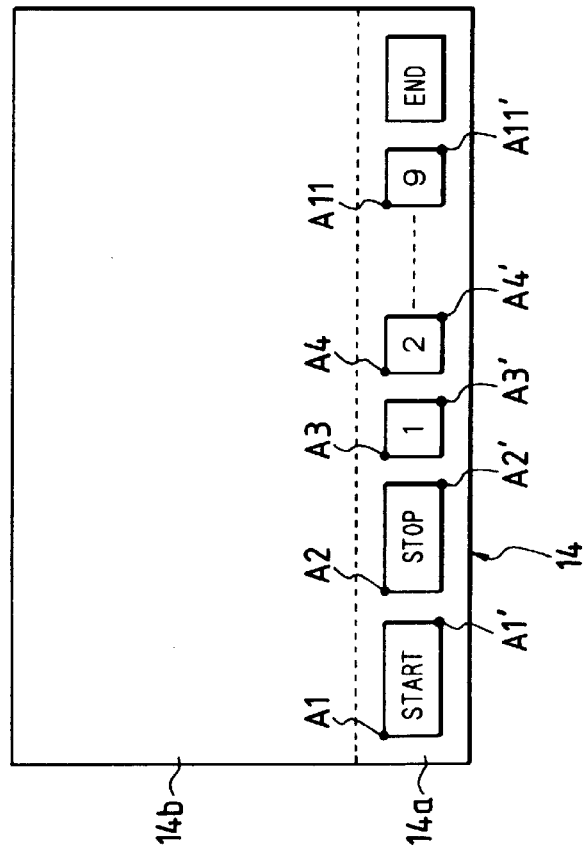

The menu mat 14 is formed of a fixed key area 14a and a freely set key area 14b, as illustrated in FIG. 4(a). In the fixed key area 14a, such fixed keys as START, STOP, 1, 2, 3, . . . 9 are respectively assigned to the areas determined in advance. For instance, the START key is assigned to the area defined by the two points, A1 and A1', and the STOP key is assigned to the area defined by the two points, A2 and A2'. In the meanwhile, the ROM 6 or the RAM 8 backed-up with a battery stores a collating table which correlates the areas each defined by a set of two points and the fixed key information (hereinafter called "fixed key table"), for example, in the manner as shown in FIG. 5(a). Therefore, when a user pushes with the stylus pen 13 one point in the area defined by, for example, the two points A2 and A2'on the menu mat 14 placed on the coordinate input surface 11, the CPU 5 makes reference to the fixed key table mentioned above and can thereby detect that the stop function has been selected.

Figure 6:
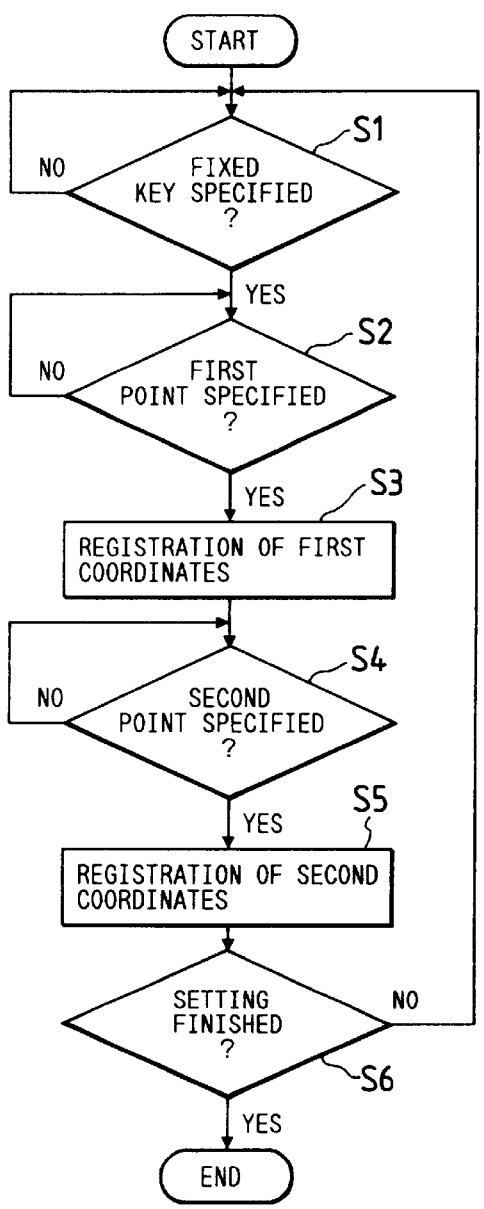
FIG. 6 is a flow chart for illustration of the operation of the first embodiment.

Next, with reference to FIGS. 4 through 6, a description is made of the operating steps by which a user freely sets the same functions as those of the fixed keys on the freely set key area 14b in the menu mat 14. FIG. 6 is a flow chart illustrating the operation of the CPU 5.

When a user has selected the registering mode for the freely set keys, the CPU 5 determines whether or not any fixed key has been specified (step S1). For example, step S1 will be in its affirmative state when the fixed key, "START", is specified, as shown in FIG. 4(b).

Then, the CPU 5 determines whether or not the first point has been specified on the freely set key area 14b (step S2), and, when the state thus determined is affirmative, the CPU 5 registers this specified point as the first coordinates on the freely set key table (see FIG. 5(b)), which is provided in the RAM 8 backed-up by a battery (step S3). Next, the CPU 5 determines whether or not a second point has been specified on the freely set key area 14b (step S4), and, if the state so determined is affirmative, then the CPU 5 registers this specified point as the second coordinates on the freely set key table (step S5). Subsequently, the CPU 5 determines whether or not the user has indicated the finish of the setting operation (step S6), and, in case the state so determined is negative, the CPU 5 returns to step S1 and repeat the setting operations described above. In case the state just mentioned is affirmative, then the CPU 5 finishes the registering operation.

For example, when the two points B1 and B1' are specified after the fixed key "START" is instructed by a push (see FIG. 4(b)), then the area defined by the two points B1 and B1' is registered as a key having the function of "START" on the freely set key table. In the same manner, the area defined by the two points B3 and B3' is registered as a key having the function of "1" in case the two points B3 and B3' are specified after the fixed key "1" is selected.

It is considered to be evident that the area on the freely set key area 14b can be set at an arbitrarily determined position and with an arbitrarily determined size, depending on the user's preference.

Figure 7:
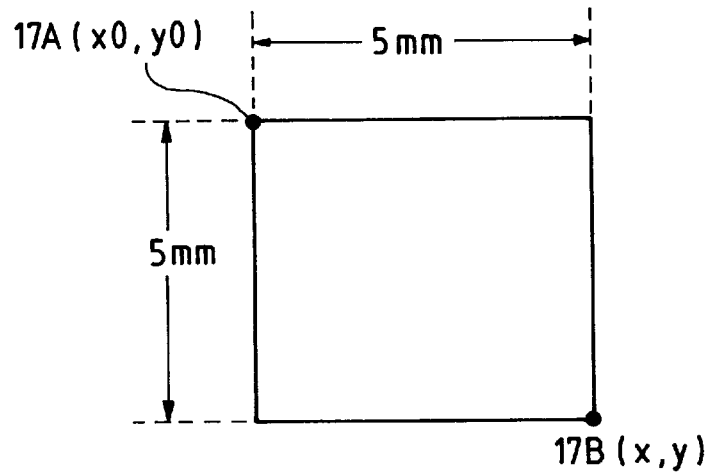

Next, a modification of the above embodiment is described with reference to FIGS. 7 and 8. In the above embodiment, two points are specified in setting an area for a freely set key on the freely set key area 14b, but this modification designed so as to be capable of performing this setting by specifying just one point. FIG. 7 is a chart for illustration of this modification, and FIG. 8 is a flow chart showing the operation of the CPU 5.

As illustrated in FIG. 7, when a first point 17A is specified with the stylus pen 13 on the freely set key area 14b, coordinates (x, y) at a second point 17B are automatically calculated by the addition of, for example, 5 mm to the coordinates (x0, y0) of the first point 17A, and the area is defined by a set of the coordinates of the first point 17A and the second point 17B.

Figure 8:
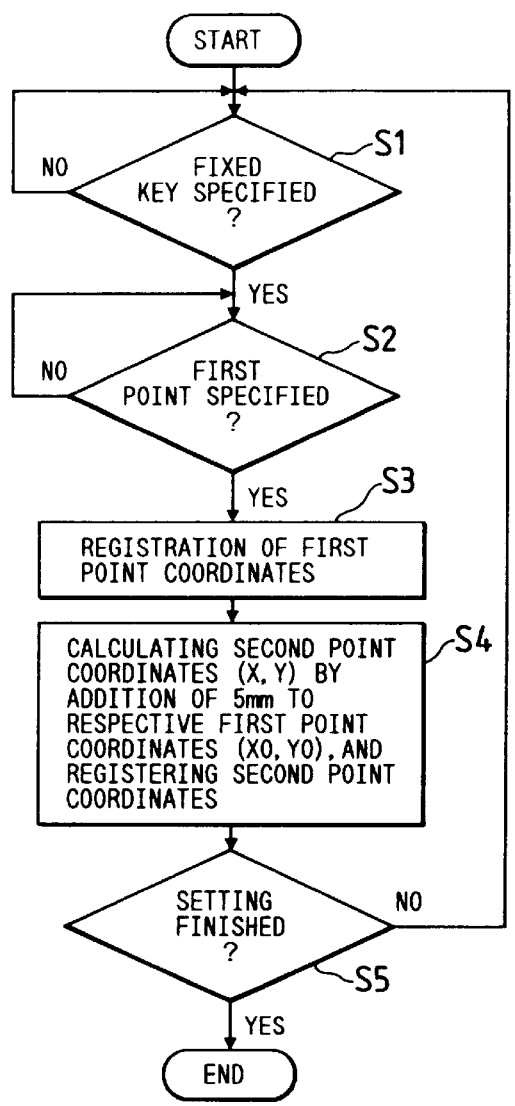
FIGS. 7 and 8 are charts illustrating a modification of the first embodiment.

A feature of this modification is that the coordinates (x, y) of the second point are calculated automatically at step S4 of FIG. 8 by the addition of 5 mm to the coordinates (x0, y0) of the first point which is specified at step S2, and that a set of the coordinates so determined are registered on the freely set key table.

According to this modification, the registration of a freely set key can be accomplished by the definition of one point, improving the ease of operation.

Figure 9:
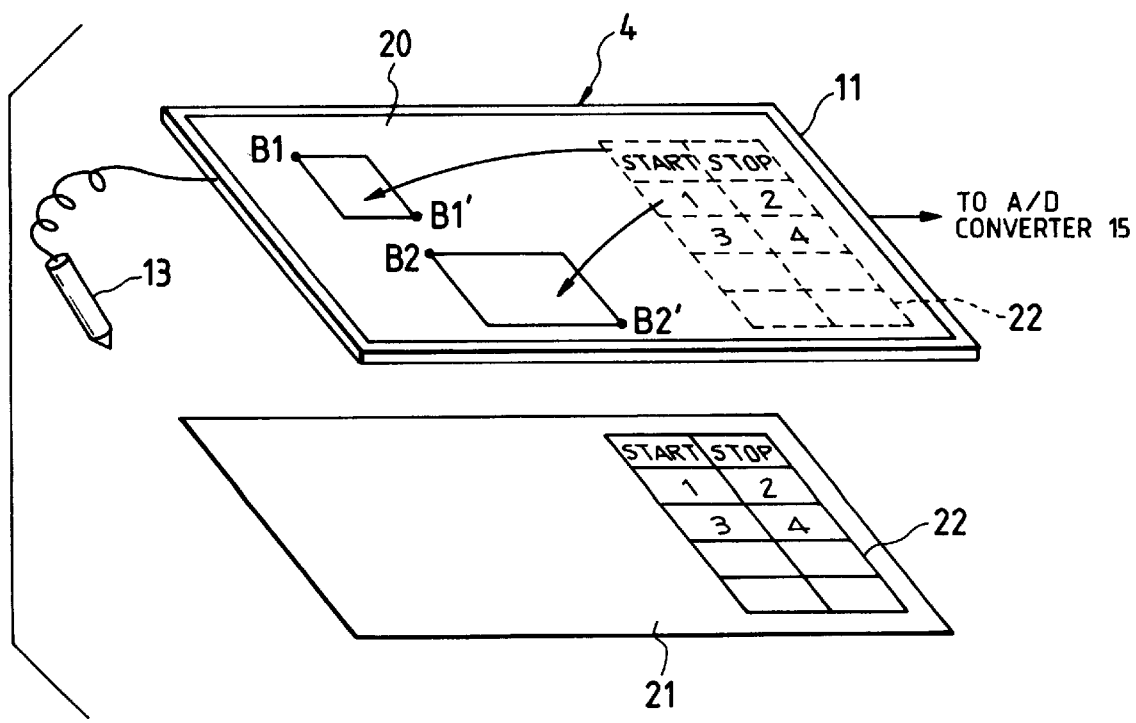
FIG. 9 is a drawing for a description of a second embodiment of the present invention.

Next, a second embodiment of the present invention is described with reference to FIG. 9, which includes a coordinate input surface 11, a freely set key setting sheet 20 made of paper or the like and placed on the coordinate input surface 11; and, a menu mat 21 made of a sheet of transparent material and placed on the freely set key setting sheet 20. In a part of this menu mat 21, fixed keys 22 are written as illustrated in FIG. 9, and when this menu mat 21 is placed on the coordinate input surface 11, the coordinates for the two points indicating the area corresponding to each fixed key have already been registered in correlation with the function in the ROM 6 or the RAM 8 with the battery backup.

Also on the freely set key setting sheet 20, the areas defined by two points B1 and B1', two points B2 and B2', and so forth are written in advance, and these areas are registered in advance in the RAM 8.

A user places the freely set key setting sheet 20 and the menu mat 21 in the stated order on the coordinate input surface 11, selects the registering mode for the freely set keys by a manipulation means (not shown), and specifies with the stylus pen 13 one of the fixed keys 22 on the menu mat 21 and one area in the freely set key setting sheet 20. Following these steps, the user can register the function of the particular fixed key in the area thus specified. In other words, the user can copy the particular fixed key to the specified area.

The second embodiment has an advantageous effect that a user can use a freely set key setting sheet 20, provided by a manufacturing company, with a plural number of areas printed in a clear and favorable layout. Moreover, as it is possible to specify each of a plural number of areas by specifying one point, an improvement in the operational efficiency of registering the operation keys can be expected.

Next, a modification of the second embodiment is described in the following. First, a manufacturing company or the like stores in advance the data on a plural number of areas in the freely set key area in the ROM 6 or the RAM. Then, in copying the fixed keys to the freely set key area, a user can obtain a freely set key setting sheet for use thereafter by printing out the data of the areas in the freely set key area through the printer unit 2.

With this modification, a user can obtain a freely set key setting sheet 20 with the freely set key area printed in a clear layout from the printer unit 2, so that the user need not purchase the freely set key setting sheet from an outside source.

Moreover, data for a plural types of the freely set key area can be stored in the ROM 6 or the RAM 8 so that a user can freely choose any of the types. It is desirable to design the apparatus such that the freely set key setting sheet printed out last will be effective. In this case, a user can select any preferable one out of a plural types of layouts of the freely set key area.

Figure 10:
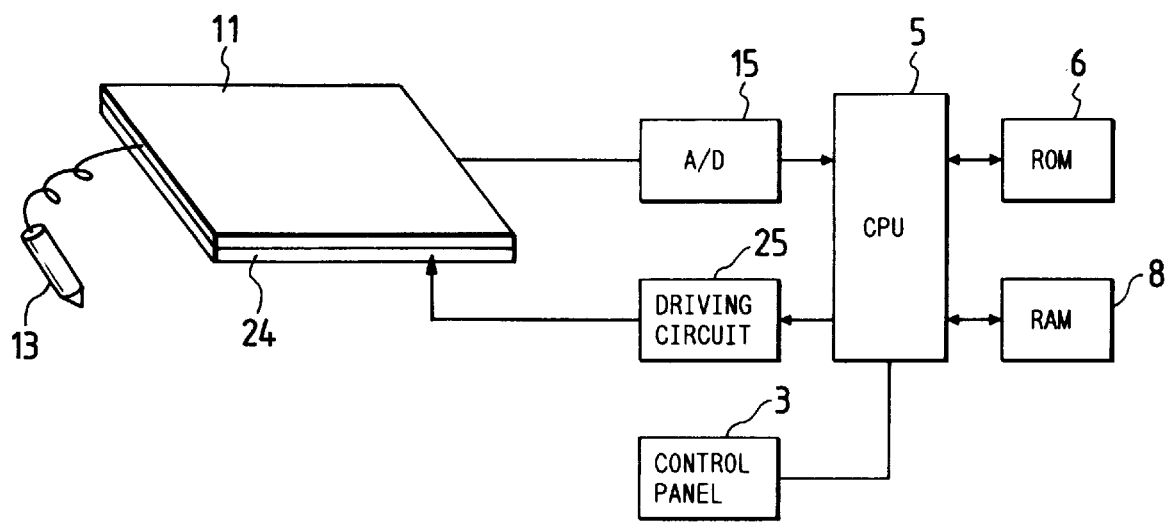
FIG. 10 is a block diagram illustrating a third embodiment of the present invention.

Next, a description of a third embodiment of the present invention is made with reference to FIG. 10. Shown in FIG. 10 are a transparent coordinate input surface 11; a display unit 24 comprised of a liquid crystal panel and so forth; and a driving circuit 25 for this display unit. The other reference numbers and marks in FIG. 10 denote the same or equivalent items as those given in FIG. 3.

In this embodiment, the data (in the form of a table) on the fixed keys and the corresponding areas are stored in advance in the ROM 6 or RAM 8. Therefore, when a user selects the registering mode of the freely set keys by a manipulating means not illustrated in the figure, the fixed keys 27 (refer to FIG. 11) are displayed in a part of the display unit 24. As the coordinate input surface 11 is transparent, the user can see the fixed keys 27 thus displayed through the input surface 11.

Figure 11:
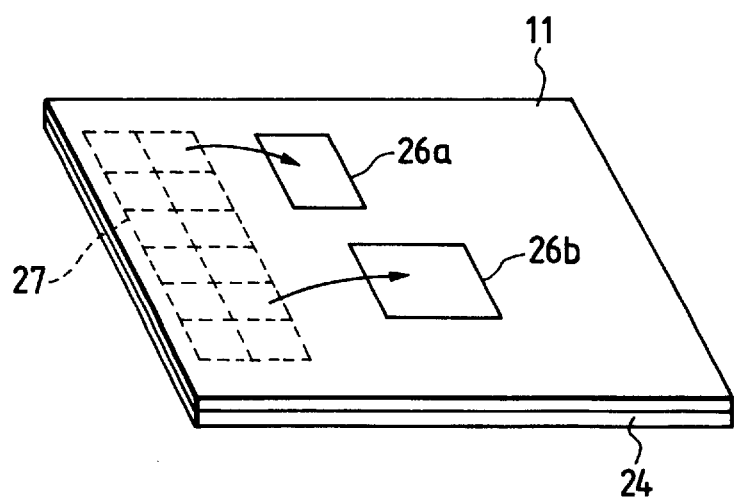
FIG. 11 is a drawing illustrating the operation of the third embodiment.

Therefore, the user can specify one of the fixed keys with a stylus pen 13 as illustrated in FIG. 11 and also can specify an area 26a by the input of either a single point or two points. Then, the area 26a is displayed on the display unit 24 and is given the same function as that of the specified fixed key.

The function of the fixed key can be registered in the area 26a in this manner. Also, it will be evident that the function of another fixed key can be registered in an area 26b in the same manner.

One advantage of this embodiment is that the freely set keys thus registered are indicated on the display unit 24, so that the freely set key setting sheet is not necessary.

Although in the above embodiments the functions of the fixed keys are input from the coordinate input surface, the present invention is not limited to this input process, but they may be input from the control panel 3.

Figures 12, 13:
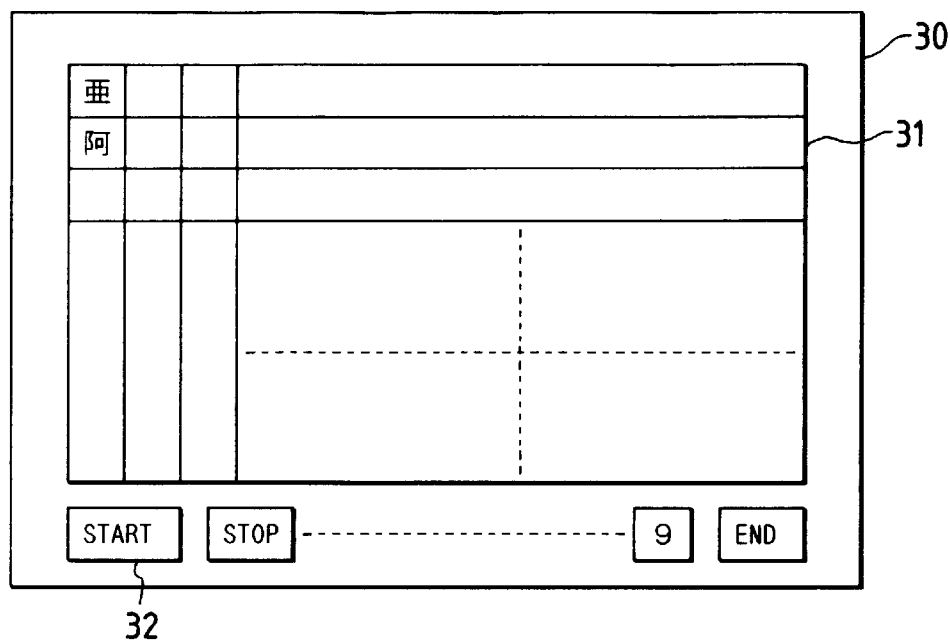
FIGS. 12 and 13 are charts for illustration of a fourth embodiment of the present invention.
Figure 14:
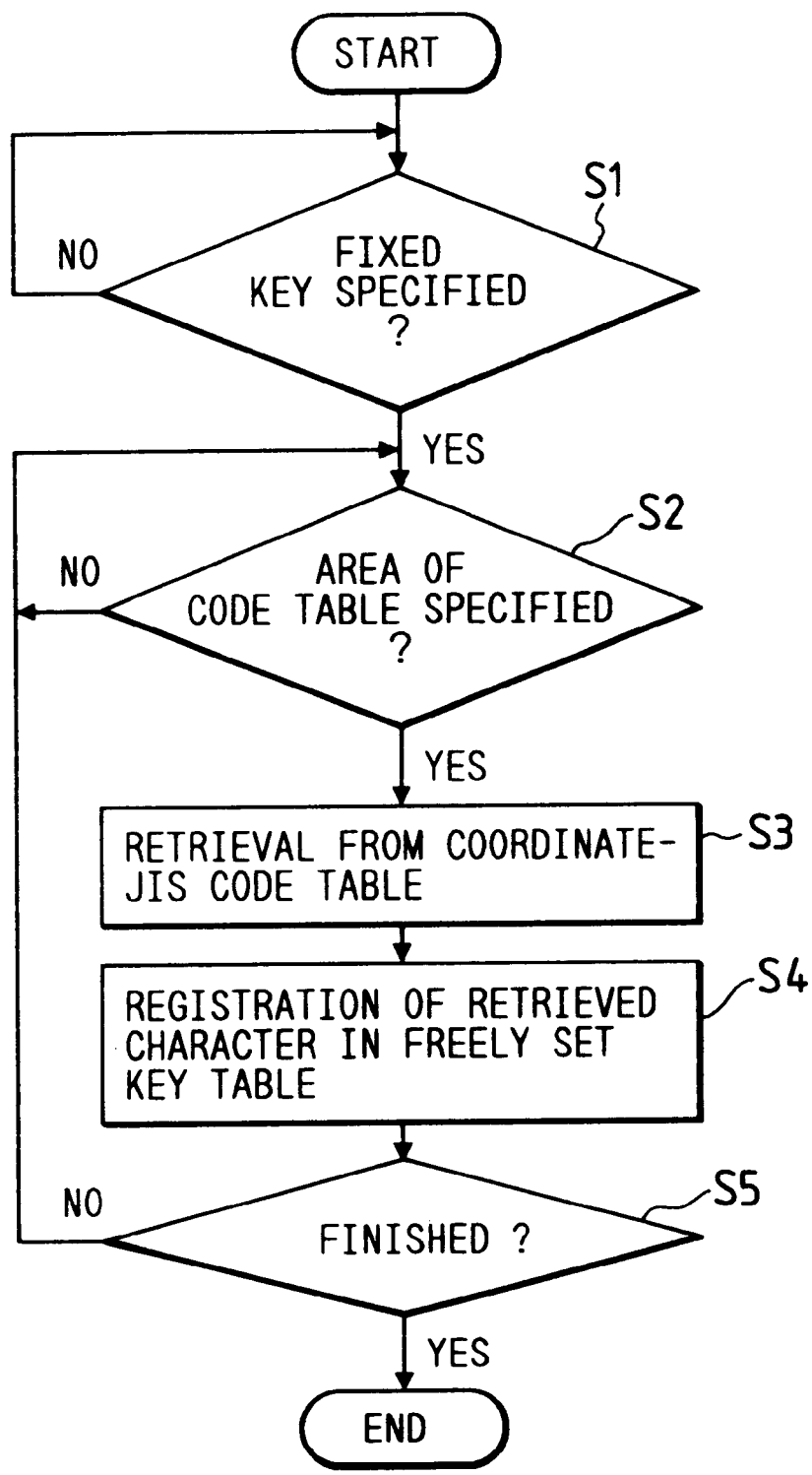
FIG. 14 is a flow chart illustrating the operation of the fourth embodiment.

Next, with reference to FIGS. 12 through 14, a description is made of a fourth embodiment of the present invention, in which key names are registered for the freely set keys as set in the first through third embodiments. FIG. 14 is a flow chart illustrating the operation of the CPU 5.

As a prerequisite to this embodiment, it is assumed here that a collating table (hereafter called "coordinate-JIS code table") for the coordinates and the JIS code table is stored in advance in the ROM 6 or the RAM 8.

When key names are to be registered for the freely set keys, the key name registering mode is set on by a manipulation means not illustrated in the figure, and a key name registering mat 30 as shown in FIG. 12 is placed on the coordinate input surface 11 (refer to FIG. 3). Moreover, it is assumed here that the JIS code table 31 and the fixed keys 32 are written on the key name registering mat 30. It is required that the positions of these fixed keys 32 are identical to those shown in FIG. 4(*a*).

Now, when a user specifies one of the fixed keys 32 with the stylus pen 13, step S1 in FIG. 14 is affirmative and the operation proceeds to step S2. At step S2, it is determined whether or not any area on the JIS code table 31 has been specified. If affirmative, retrieval is performed in the coordinate-JIS code table on the basis of the area thus specified (step S3). Upon the completion of the retrieval, the retrieved character is registered in the key name column of the freely set key table.

For example, when the fixed key of "START" is pushed at step S1, with the "開" key in the JIS code table 31 being pushed thereafter at step S2 and the "始" key next, the name, "開始", is registered for "START" in the key name column of the freely set key table, as shown in FIG. 13.

When it is judged at step S5 that the "END" key has been pushed, the operation of the key name registration is finished.

FIG. 13 shows one example of the freely set key table formed by this embodiment.

Figure 15:
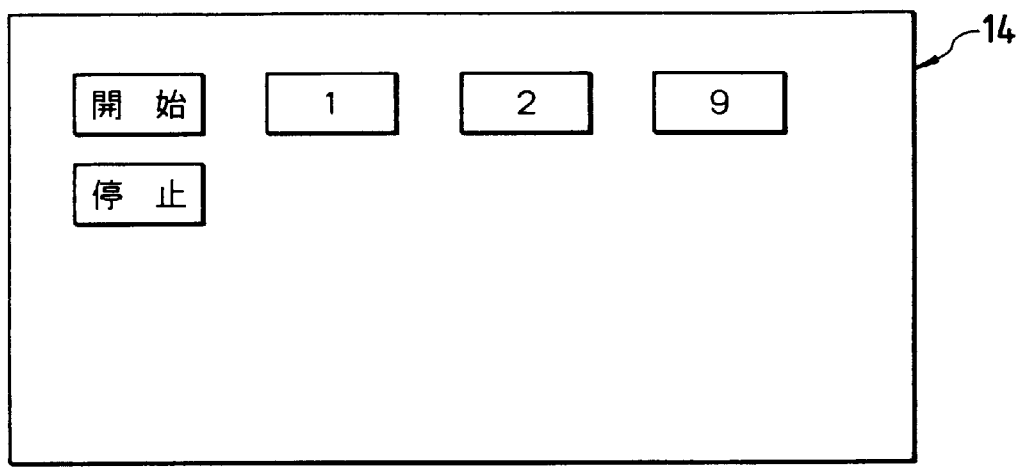
FIG. 15 is chart illustrating one example of a result obtained from the operation of the fourth embodiment.

According to this embodiment, a menu mat 14 shown in FIG. 15 can be obtained with the names of the keys printed in the specified areas of the freely set key area by printing out the menu mat 14 after the registration of the key names. FIG. 15 illustrates the menu mat in correspondence with FIG. 4(*b*). If the keys are operated with this menu mat 14 placed on the coordinate input surface 11, the distinct indication of the key names evidently enables a user to perform the operation with ease and efficiency.

Next, in respect of the registration of key names as performed in a fifth embodiment of the present invention, a description will now be made with reference to FIGS. 16 and 17.

Figure 16:
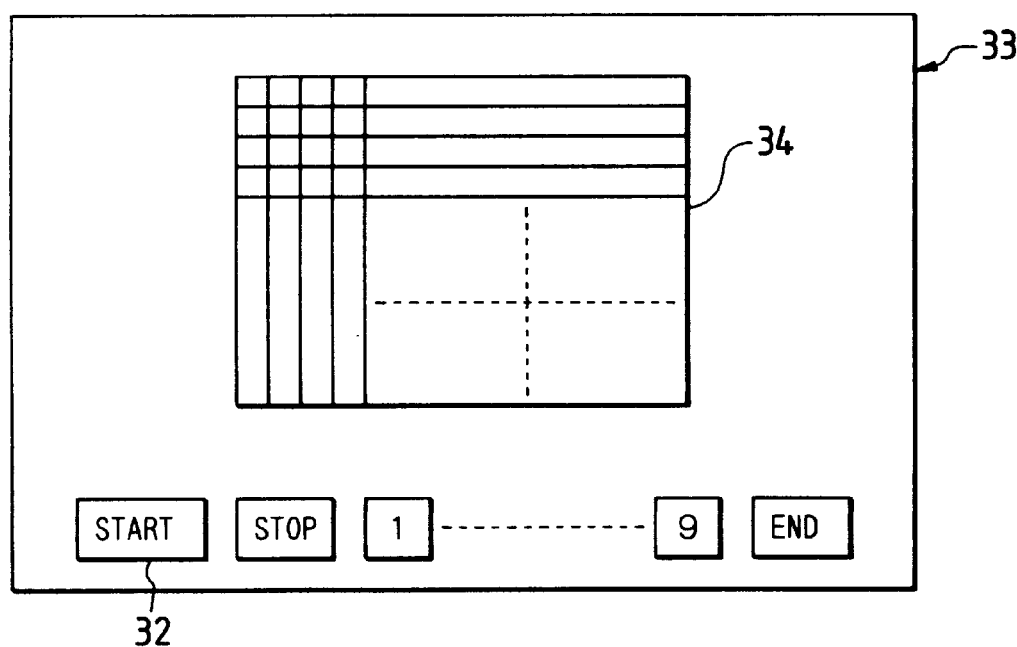
FIG. 16 is a chart illustrating a fifth embodiment of the present invention.
Figure 17:
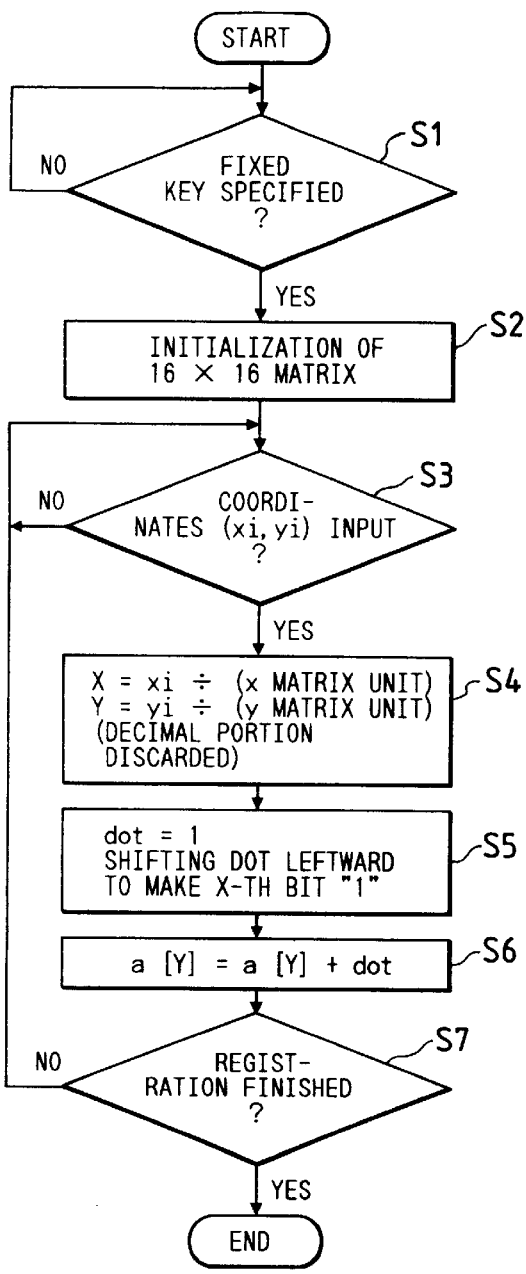
FIG. 17 is a flow chart for illustration of the operation of the fifth embodiment.

FIG. 16 shows a pattern registering mat 33 for the input of a logogram in a pattern formed of dots. The pattern registering mat 33 has a pattern registering matrix 34 and fixed keys 32 written thereon. This pattern registering matrix 34 is formed of a matrix composed of 16×16 elements in the case of this embodiment.

A work area is set up in the RAM 7 (refer to FIG. 3), and an area for the 16×16 matrix is set in the work area.

Next, the operation of this embodiment described with reference to FIG. 17, which is a flow chart illustrating the operation of the CPU 5.

First, the CPU 5 determines whether or not one of the fixed keys 32 has been pushed (step S1). If affirmative, the 16×16 matrix area mentioned above is initialized. That is, all elements in the 16×16 matrix are initialized to "0" (step S2).

Next, the CPU 5 determines whether or not any input has been made into the pattern registering matrix 34 in the pattern registering mat 33 placed on the coordinate input surface 11 (step S3). If affirmative, the CPU 5 proceeds to the next step S4 and performs the arithmetic operations given in the following:

$$X = xi \div (x \text{ matrix unit})$$

$$Y = yi \div (y \text{ matrix unit}).$$

In this calculation, the decimal portions in the results of x and y are discarded and only the integral portions are taken out. Here, xi and yi express the coordinate values input on the pattern registering matrix 34, and the term "x, y matrix unit" represents the magnitude of the matrix unit in the x and y direction as expressed in the coordinate value. Therefore, the results from the arithmetic operations at step S4 express the numbers of the matrix element in the x and y directions as specified with the stylus pen 13.

Next, the operation for expressing in dot pattern the numbers of the matrix element thus obtained for the x and y directions are performed. First, the relationship, a parameter dot=1 (in 16 bits), is established at step S5, and an operation is performed for shifting the dot (i.e., the position of "1") leftward in the 16-bit row so that the X-th bit from the left is set to "1". Then, the logical sum is taken bit by bit between the above 16-bit row and the 16-bit row a[Y] in the Y-th position from the top of the 16×16 matrix to obtain a new row a[Y] (step S6).

The operation mentioned above is repeated until step S7 becomes affirmative, and the operation is put to an end.

With the above operation, the logogram input on the pattern registering matrix 34 in the pattern registering mat 33 is registered in a bit pattern in the key name column on the freely set key table (see FIG. 13).

Next, in respect of the registration of key names, a sixth embodiment is described with reference to FIGS. 18 and 19. This embodiment features a process for registering an image read from the document reading unit (a scanner) 1 in the key name column in the freely set key table.

Figure 18:
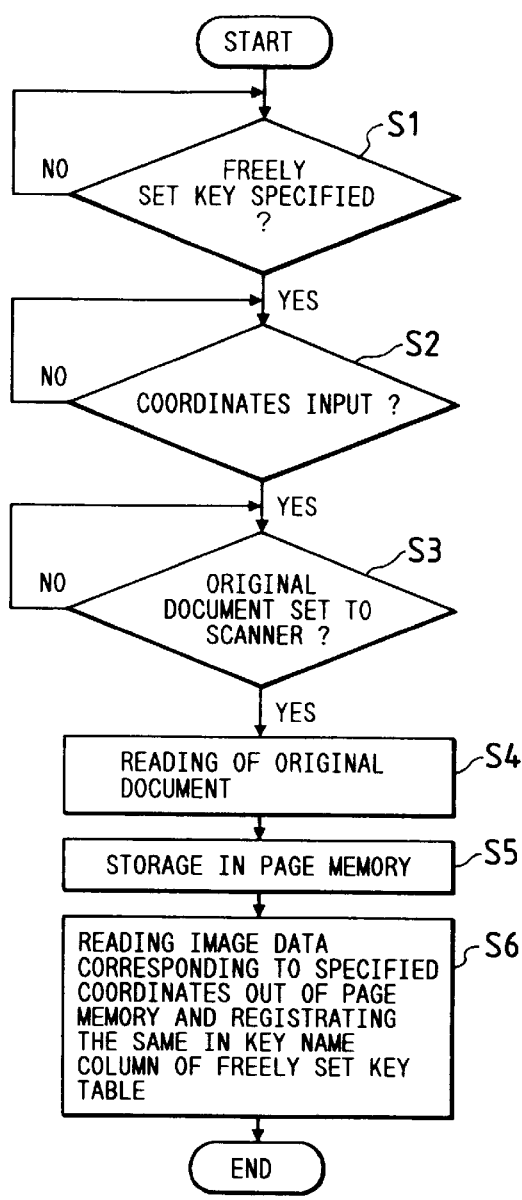
FIG. 18 is a flow chart for illustration of a sixth embodiment of the present invention.

After the image registering mode is set on by a manipulation means not illustrated in the figure, the operation shown in FIG. 18 is performed. FIG. 18 is a flow chart illustrating the operation of the CPU 5.

First, the CPU 5 determines whether or not any area in the freely set key area as set up in the manner described above has been specified (step S1). If affirmative, the CPU 5 then determines whether or not there has been any input of coordinates of two points from the coordinate input surface 11 (step S2).

Figure 19:
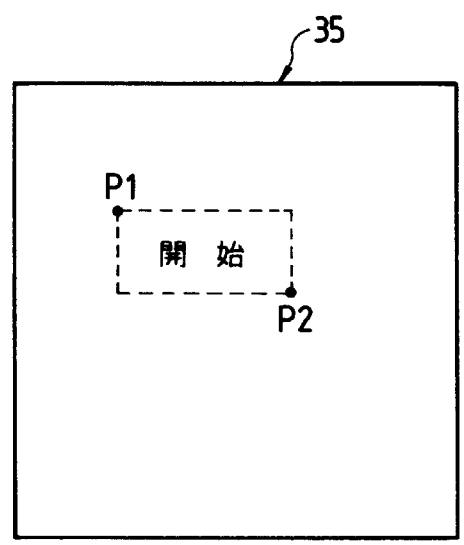
FIG. 19 is chart illustrating the sixth embodiment.

For example, a desired original document 35 is placed on the coordinate input surface 11, and two points P1 and P2 are specified, as illustrated in FIG. 19.

If step S2 becomes affirmative, the CPU 5 determines whether or not any original document is set in the document reading unit (scanner) 1 (step S3). If affirmative, the operation for reading the document is carried out (step S4), and the image information thus read is stored in a page memory (step S5). Subsequently, an operation is performed for reading the data corresponding to the two points P1 and P2 as specified at step S2 out of the page memory and for registering the data in the key name column of the freely set key table (see FIG. 13). In the example shown in FIG. 19, the image information of "開始" is registered in the prescribed key name column of the freely set key table.

This embodiment makes it possible to freely register an image written on the document in the prescribed key name column of the freely set key table, offering an advantage that the registration of key names can be done in an extensive range.

Next, in respect of the registration of key names, a seventh embodiment is now described with reference to FIG. 20.

Figure 20:
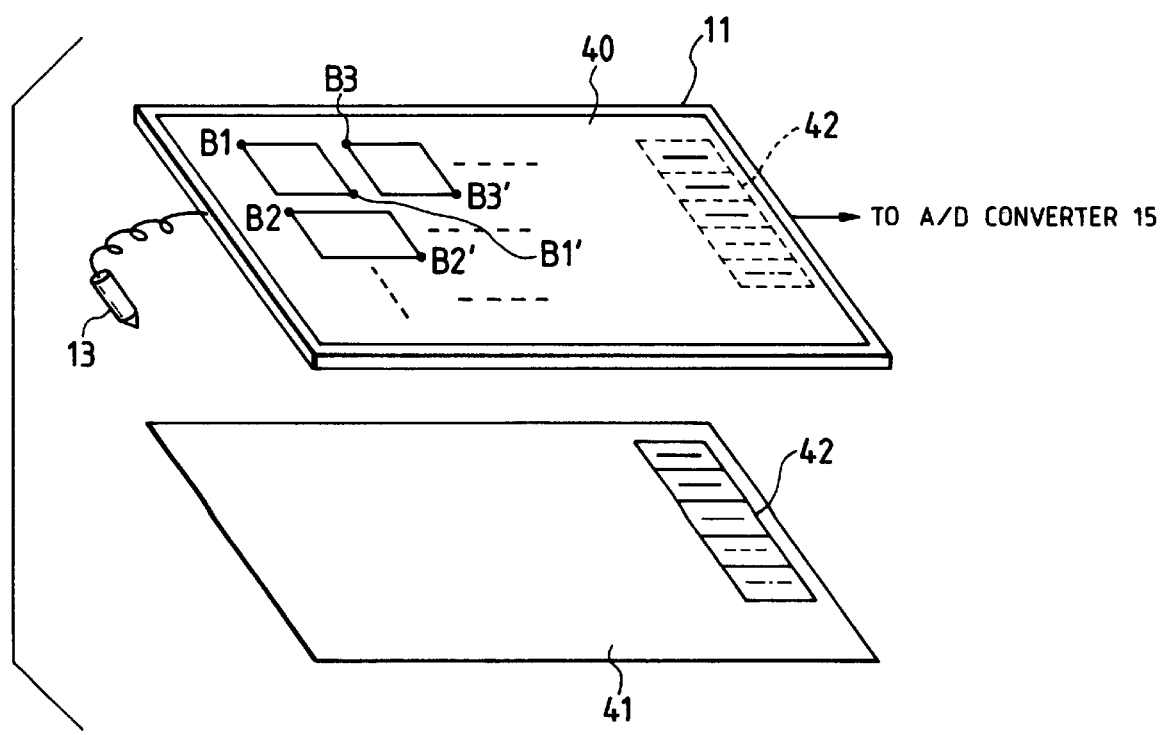
FIG. 20 is a drawing for illustration of a seventh embodiment of the present invention.

FIG. 20 shows a coordinate input surface 4; 40, a freely set key setting sheet of paper or the like to be placed on the coordinate input surface 11; and a menu mat 41 made of a sheet made of transparent material and placed on the freely set key setting sheet 40. On part of the menu mat 41, keys (line width selecting keys) 42 are provided for selecting the thickness of lines as shown in the figure. If a character, a line drawing, or the like is drawn with the stylus pen 13 after one of the line width selecting keys 42 is selected with this menu mat 41 placed on the coordinate input surface 11, then the character or line drawing can be rendered in the thickness of the line as selected with the line width selecting keys 42.

Therefore, a user can register an image name with a selected line thickness in the key name column of the freely set key table (refer to FIG. 13) by writing the name in the freely set key area with the stylus pen 13 after selecting one of the line width keys 42 with the stylus pen 13, with the freely set key setting sheet 40, in which the freely set key area is written, and the menu mat 41 placed on the coordinate input surface 11.

According to these embodiments, an image name can be freely produced by handwriting, offering an advantageous effect that a user can register an arbitrarily selected image name in his own handwritten characters in the prescribed key name column of the freely set key table.

Next, a description is made of a registering method for registering function keys in arbitrarily selected areas in the coordinate input surface of the coordinate input device used in combination with a plural number of menu mats.

In the registering system described in the first embodiment, a menu mat 14 shown in FIG. 4 is used, but, as this menu mat 14 has a small space for the fixed key area 14a, the space does not permit writing all the fixed keys in it. It is the following embodiment that has been made to overcome this problem.

Figure 21A:
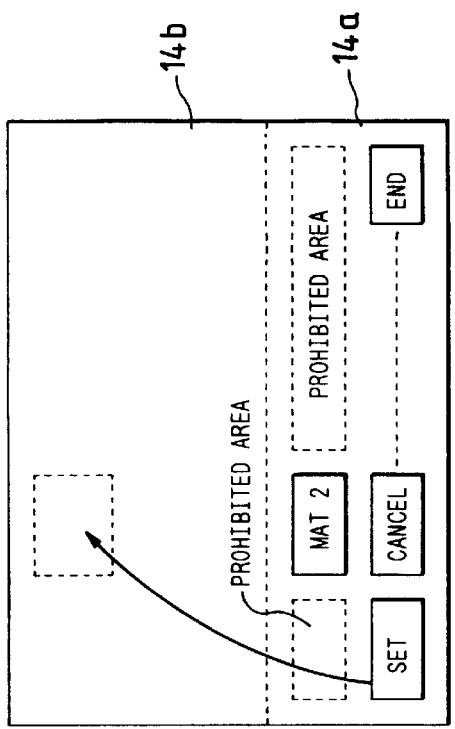
FIGS. 21(a) and 21(b) are charts for illustration of an eighth embodiment of the present invention.
Figure 21B:
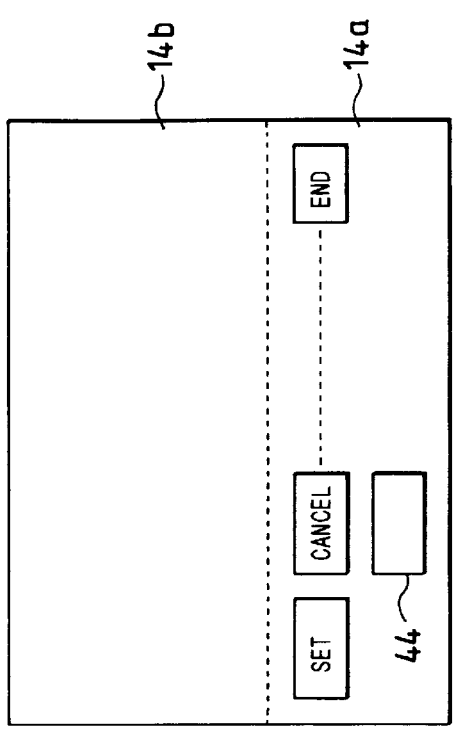
Figure 22:
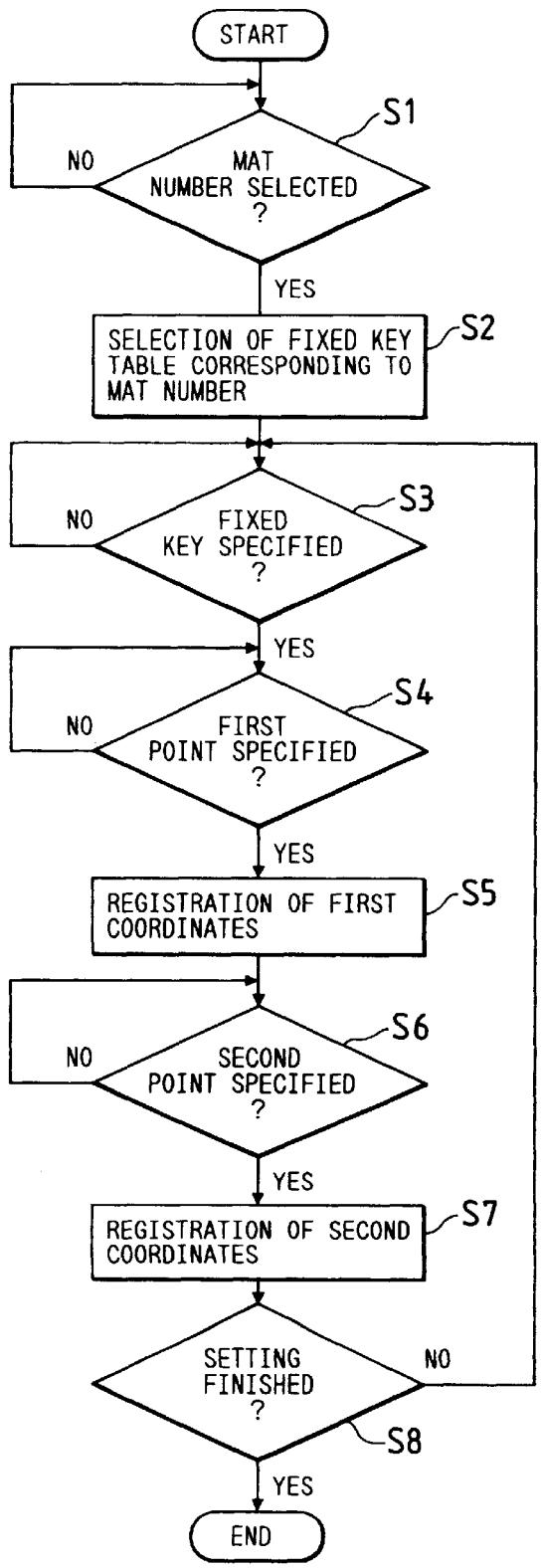
FIG. 22 is a flow chart for illustration of the eighth embodiment.

FIGS. 21 and 22 illustrate the description made here with regard to an eighth embodiment of the present invention. FIG. 22 is a flow chart illustrating the operation of the CPU 5.

FIGS. 21(a) and 21(b) show two menu mats, each of which is provided with an area for the selection of a mat number. The ROM 6 or the RAM 8 store fixed key tables corresponding to the respective mat numbers. Although only two menu mats are illustrated in these figures, it goes without saying that the number of the menu mats according to the present invention is not limited to two.

The operation to be performed in this embodiment is as illustrated in FIG. 22.

When a user has selected the registering mode for the freely set keys, the CPU 5 determines whether or not a selection has been made of a mat number (step S1). If the CPU 5 determines that such a selection has been made, the CPU 5 then performs the selection of the fixed key table corresponding to the particular mat number (step S2). Next, the CPU 5 determines whether or not a fixed key has been specified (step S3). If affirmative, an operation is performed for registering the two points specified by the user on the freely set key area 14b, in correlation with the specified fixed key mentioned above, in the freely set key table (steps S4 through S7).

Next, when a fixed key registered on another menu mat is to be set in the freely set key area 14b of the menu mat 14, the fixed key of "END" is pushed once (step S8). After the menu mat is replaced with another, the operation is started again from step S1 in the manner described above.

As described hereinabove, this embodiment makes it possible to register many kinds of fixed keys in the freely set key area 14b of the menu mat 14.

Figure 23A:
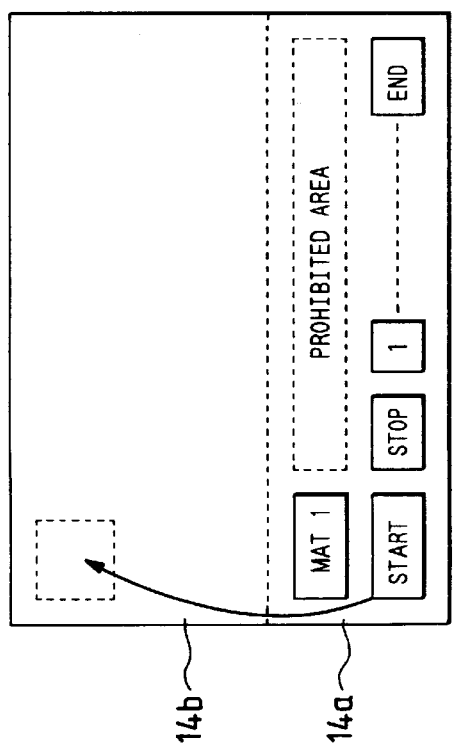
FIGS. 23(a) and 23(b) are charts illustrating a modification of the eighth embodiment.
Figure 23B:
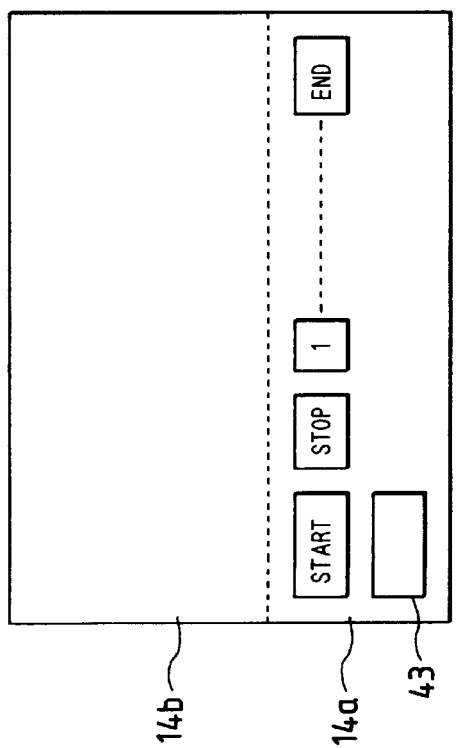

FIG. 23 illustrates a modification of the eighth embodiment. This modification shows a method of identifying the type of a menu mat on the basis of holes 43 and 44 made in respective menu mats. The detection of the positions of the holes 43 and 44 can be performed, for example, by a circuit using a photoreflector comprised of a light-emitting diode and a phototransistor.

It goes without saying that the specification of the type of a menu mat can be done also with numerical figures of the ten key unit set on the control panel.

Now the preferred embodiments of the present invention have been described so far, and it is evident that any modifications of the preferred embodiments given hereinabove are to be included within the scope and extent of the present invention so long as such modifications do not deviate from the objects and technical scope of the present invention.

As it is clearly recognized in light of the description made hereinabove, the present invention warrants expectations of the advantageous effects described in the following:

(1) Now that a user can assign the function of a fixed (operation) key to a selected area by performing the manipulation of the fixed (operation) key and the operation for setting an area on the coordinate input surface, with the registering mode being selected, the user can thereby easily copy any fixed (operation) key to an arbitrarily selected area in the coordinate input surface.

(2) Since a user can thus copy any fixed (operation) key to an arbitrarily selected area in the coordinate input surface, the user can form a control panel in such a size, a shape, and a layout as will be suitable for his preference.

(3) Since key names can be given to the areas formed on the coordinate input surface by input with reference to the JIScode table, by logogram input, by handwritten input, or by input through reading an original document, the user can perform the key input with ease from the coordinate input surface.

(4) Since the functions corresponding to the fixed (operation) keys can be assigned to the areas on the coordinate input surface by the use of a plural number of menu mats, a user can register many types of functions.

What is claimed is:

1. An apparatus for registering an operation key on a coordinate input surface of a coordinate input device, the coordinate input surface having a fixed key area and a freely set key area, comprising:

means for storing a fixed key table which correlates operation key information representing a function of a specified operation key with fixed area information representing a specified area of the fixed key area of the coordinate input surface, said specified operation key being a fixed operation key;

means for selecting a registering mode;

means for specifying the operation key;

means for specifying a freely set sub-area of the freely set key area in response to an indication of one or two size-determining points on the coordinate input surface within a continuous range of variation; and means for producing a freely set key table that correlates operation key information representing a function of the specified operation key and further area information representing the freely set sub-area of the freely set key area of the coordinate input surface.

2. The apparatus according to claim 1, wherein the freely set sub-area specifying means comprises a key setting sheet on which fixed operation keys are written in advance and which is placed on the coordinate input surface, the freely set sub-area being further specified by specifying one of the fixed operation keys in the key setting sheet.

3. The apparatus according to claim 1, wherein the operation key specifying means includes a display device placed under the coordinate input surface, said coordinate input surface being transparent, for displaying operation keys to be specified and displaying function-representing information of specified operation keys.

4. The apparatus according to claim 1, wherein the operation key specifying means comprises a plurality of menu mats selectively placed on the coordinate input surface, through which the operation key is specified, each of the plurality of menu mats having an identification portion to identify a kind of a menu mat being placed on the coordinate input surface.

5. The apparatus according to claim 1, further comprising:

means for registering a key name of the specified operation key in the freely set key table, comprising:

a key name registering mat having divided areas in which respective ones of a plurality of items of character information are written, said key name registering mat being disposed on the coordinate input surface;

means for storing an area-character table which stores second area information representing areas of the coordinate input surface corresponding to the respective divided areas of the key name registering mat and the plurality of character information;

means for specifying a selected one of said divided areas of said key name registering mat; and means for registering a character in the freely set key table as the key name of the specified operation key, said character corresponding to the character information written in a respective one of the divided areas of said key name registering mat.

6. The apparatus according to claim 5, wherein the key name registering mat comprises a logo-pattern registering mat having a plurality of divided areas written in a matrix form, said logo-pattern registering mat disposed on the coordinate input surface and wherein the key name registering means further comprises:

means for specifying selected divided areas of said logo-pattern registering mat;

means for storing third area information representing areas of the coordinate input surface corresponding to the specified divided areas;

means for converting said third area information into an image; and means for registering the image in the freely set key table as the key name.

7. The apparatus according to claim 5, wherein the key name registering means further comprises:

means for reading a sheet placed on the coordinate input surface;

means for extracting information representing an image written in a specified area of the sheet; and means for registering the image in the freely set key table as the key name.

8. The apparatus according to claim 5, wherein the key name registering means further comprises:

means for specifying a thickness of a line to be drawn on the coordinate input surface; and means for registering an image drawn on the coordinate input surface in the freely set key table as the key name.

9. An apparatus for registering an operation key on a coordinate input surface of a coordinate input device, the coordinate input surface having a fixed key area and a freely set key area, comprising:

means for storing a fixed key table which correlates operation key information representing a function of a specified operation key with fixed area information representing a specified area of the fixed key area of the coordinate input surface, said specified operation key being a fixed operation key;

means for selecting a registering mode;

means for specifying the operation key;

means for specifying a freely set sub-area of the freely set key area in response to an indication of one or two size-determining points on the coordinate input surface within a continuous range of variation;

means for producing a freely set key table that correlates operation key information representing a function of the specified operation key and further area information representing the freely set sub-area of the freely set key area;

means for specifying a thickness of a line to be drawn on the coordinate input surface; and means for registering an image drawn, at least in part with said line of said thickness, on the coordinate input surface in the freely set key table as the key name.

10. An apparatus for registering an operation key on a coordinate input surface of a coordinate input device, the coordinate input surface having a fixed key area and a freely set key area, comprising:

means for storing a fixed key table which correlates operation key information representing a function of a specified operation key with fixed area information representing a specified area of the fixed key area of the coordinate input surface, said specified operation key being a fixed operation key;

means for selecting a registering mode;

means for specifying the operation key;

means for specifying a sub-area of the freely set key area in response to an indication of one or two size-determining points on the coordinate input surface within a continuous range of variation, both position and extent of said sub-area being freely set by a user; and means for producing a freely set key table that correlates operation key information representing a function of the specified operation key and further area information representing the sub-area as freely set in position and extent within the freely set key area of the coordinate input surface.

11. The apparatus according to claim 10, wherein the sub-area specifying means comprises a key setting sheet on which the fixed operation keys are written in advance and which is placed on the coordinate input surface, the sub-area as freely set in position and extent being further specified by specifying for copying one of the fixed operation keys in the key setting sheet.

12. The apparatus according to claim 10, wherein the operation key specifying means includes a display device placed under the coordinate input surface, said coordinate input surface being transparent, for displaying operation keys to be specified and displaying function-representing information of specified operation keys.

13. The apparatus according to claim 10, further comprising:
   means for registering a key name of the specified operation key in the freely set key table, comprising:
   a key name registering mat having divided areas in which respective ones of a plurality of items of character information are written, said key name registering mat being disposed on the coordinate input surface;
   means for storing an area-character table which stores second area information representing areas of the coordinate input surface corresponding to the respective divided areas of the key name registering mat and the plurality of character information;
   means for specifying a selected one of said divided areas of said key name registering mat; and
   means for registering a character in the freely set key table as the key name of the specified operation key, said character corresponding to the character information written in a respective one of the divided areas of said key name registering mat.

14. The apparatus according to claim 13, wherein the key name registering mat comprises a logo-pattern registering mat having a plurality of divided areas written in a matrix form, said logo-pattern registering mat disposed on the coordinate input surface, and wherein the key name registering means further comprises:
   means for specifying selected divided areas of said logo-pattern registering mat;
   means for storing third area information representing areas of the coordinate input surface corresponding to the specified divided areas;
   means for converting said third area information into an image; and
   means for registering the image in the freely set key table as the key name.

15. The apparatus according to claim 13, wherein the key name registering means further comprises:
   means for reading a sheet placed on the coordinate input surface;
   means for extracting information representing an image written in a specified area of the sheet; and
   means for registering the image in the freely set key table as the key name.

16. The apparatus according to claim 13, wherein the key name registering means further comprises:
   means for specifying a thickness of a line to be drawn on the coordinate input surface; and
   means for registering an image drawn on the coordinate input surface in the freely set key table as the key name.

17. The apparatus according to claim 10, wherein the operation key specifying means comprises a plurality of menu mats selectively placed on the coordinate input surface, through which the fixed operation key is specified, each of the plurality of menu mats having an identification portion to identify a kind of a menu mat being placed on the coordinate input surface.

18. An apparatus for registering an operation key on a coordinate input surface of a coordinate input device, the coordinate input surface having a fixed key area and a freely set key area, comprising:
   means for storing a fixed key table which correlates operation key information representing a function of a specified operation key with fixed area information representing a specified area of the fixed key area of the coordinate input surface, said specified operation key being a fixed operation key;
   means for selecting a registering mode;
   means for specifying the operation key;
   means for specifying a freely set sub-area in position and extent of the freely set key area in response to an indication of one or two size-determining points on the coordinate input surface within a continuous range of variation;
   means for producing a freely set key table that correlates operation key information representing a function of the specified operation key and further area information representing the freely set sub-area in position and extent of the freely set key area;
   means for specifying a thickness of a line to be drawn on the coordinate input surface; and
   means for registering an image drawn, at least in part with said line of said thickness, on the coordinate input surface in the freely set key table as the key name.

19. An apparatus for registering an operation key on a coordinate input surface of a coordinate input device, the coordinate input surface having a fixed key area and a freely set key area, comprising:
   means for storing a fixed key table which correlates operation key information representing a function of a specified operation key with fixed area information representing a specified area of the fixed key area of the coordinate input surface, said specified operation key being a fixed operation key;
   means for selecting a registering mode;
   means for specifying the operation key;
   means for specifying a sub-area of the freely set key area in response to an indication of one or two size-determining points on the coordinate input surface within a continuous range of variation, said sub-area being continuously variable by a user; and
   means for producing a freely set key table that correlates operation key information representing a function of the specified operation key and further area information representing the continuously-variable sub-area of the freely set key area of the coordinate input surface.

20. The apparatus according to claim 19, wherein the sub-area specifying means comprises a key setting sheet on which fixed operation keys are written in advance and which is placed on the coordinate input surface, the continuously-variable sub-area being further specified by specifying for copying one of the fixed operation keys in the key setting sheet.

21. The apparatus according to claim 19, wherein the operation key specifying means includes a display device placed under the coordinate input surface, said coordinate input surface being transparent, for displaying operation keys to be specified and displaying function-representing information of specified operation keys.

22. The apparatus according to claim 19, further comprising:

means for registering a key name of the specified operation key in the freely set key table, comprising:

a key name registering mat having divided areas in which respective ones of a plurality of items of character information are written, said key name registering mat being disposed on the coordinate input surface;

means for storing an area-character table which stores second area information representing areas of the coordinate input surface corresponding to the respective divided areas of the key name registering mat and the plurality of character information;

means for specifying a selected one of said divided areas of said key name registering mat; and means for registering a character in the freely set key table as the key name of the specified operation key, said character corresponding to the character information written in a respective one of the divided areas of said key name registering mat.

23. The apparatus according to claim 22, wherein the key name registering mat comprises a logo-pattern registering mat having a plurality of divided areas written in a matrix form, said logo-pattern registering mat disposed on the coordinate input surface, and said key name registering means further comprises:

means for specifying selected divided areas of said logo-pattern registering mat;

means for storing third area information representing areas of the coordinate input surface corresponding to the specified divided areas;

means for converting said third area information into an image; and means for registering the image in the freely set key table as the key name.

24. The apparatus according to claim 22, wherein the key name registering means further comprises:

means for reading a sheet placed on the coordinate input surface;

means for extracting information representing an image written in a specified area of the sheet; and means for registering the image in the freely set key table as the key name.

25. The apparatus according to claim 22, wherein the key name registering means comprises:

means for specifying a thickness of a line to be drawn on the coordinate input surface; and means for registering an image drawn on the coordinate input surface in the freely set key table as the key name.

26. The apparatus according to claim 19, wherein the operation key specifying means comprises a plurality of menu mats selectively placed on the coordinate input surface, through which the fixed operation key is specified, each of the plurality of menu mats having an identification portion to identify a kind of a menu mat being placed on the coordinate input surface.

27. An apparatus for registering an operation key on a coordinate input surface of a coordinate input device, the coordinate input surface having a fixed key area and a freely set key area, comprising:

means for storing a fixed key table which correlates operation key information representing a function of a specified operation key with fixed area information representing a specified area of the fixed key area of the coordinate input surface, said specified operation key being a fixed operation key;

means for selecting a registering mode;

means for specifying the operation key;

means for specifying a sub-area of the freely set key area in response to an indication of one or two size-determining points on the coordinate input surface within a continuous range of variation, said sub-area having a property continuously-variable by a user;

means for producing a freely set key table that correlates operation key information representing a function of the specified operation key and further area information representing the sub-area of the freely set key area;

means for specifying a thickness of a line to be drawn on the coordinate input surface; and means for registering an image drawn, at least in part with said line of said thickness, on the coordinate input surface in the freely set key table as the key name.

* * * * *